March 14, 1939. A. FLUKES 2,150,369
REFRIGERATING APPARATUS
Filed Feb. 16, 1935 2 Sheets—Sheet 1

Inventor
Andrew Flukes
By Clarence A. O'Brien
Attorney

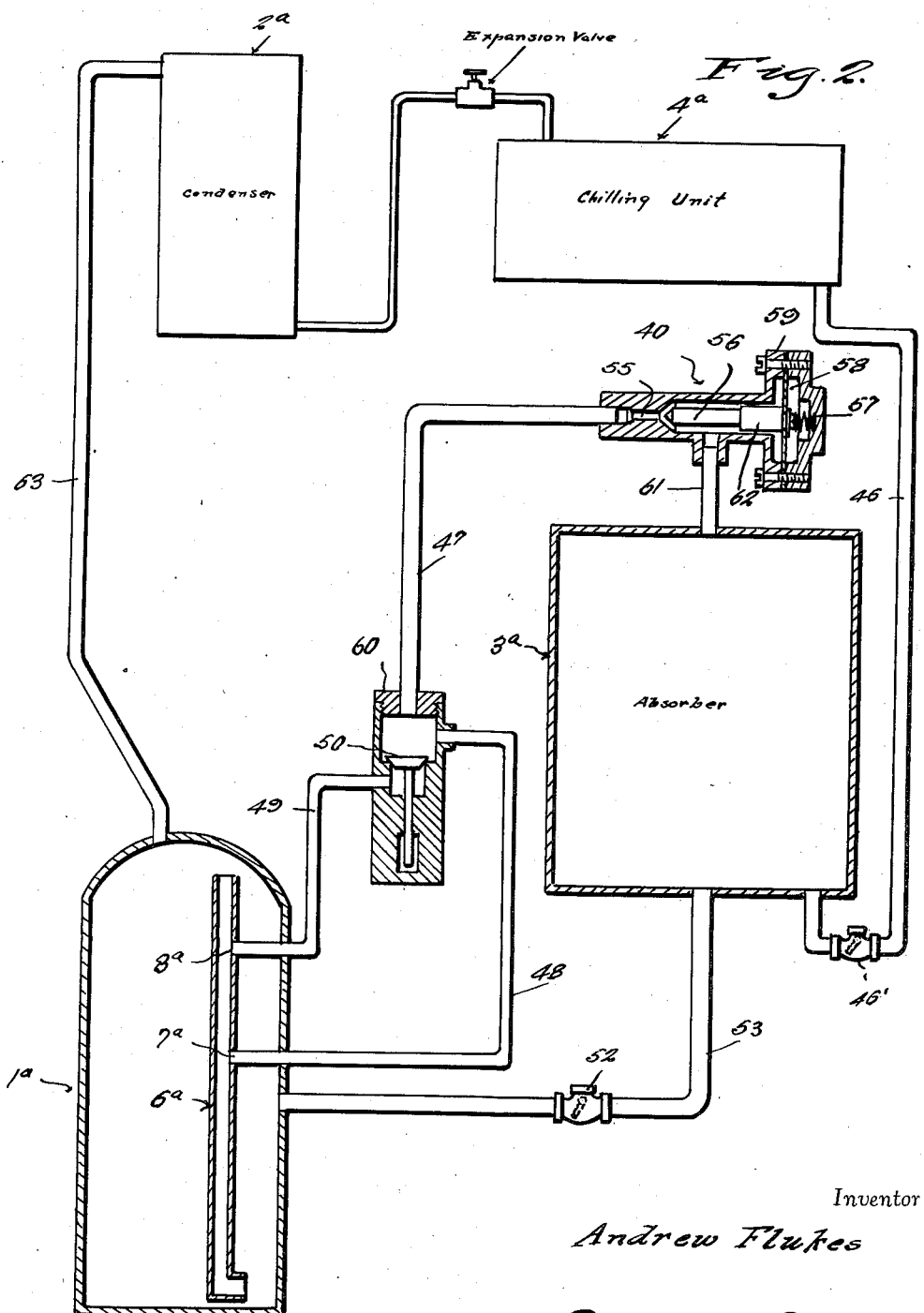

Patented Mar. 14, 1939

2,150,369

UNITED STATES PATENT OFFICE 2,150,369

REFRIGERATING APPARATUS

Andrew Flukes, Gary, Ind., assignor, by direct and mesne assignments, to Mills Novelty Company, Chicago, Ill., a corporation of Illinois Application February 16, 1935, Serial No. 6,899

29 Claims. (Cl. 62—5)

My invention relates generally to refrigerating apparatus of the absorption type, and particularly to continuously operating apparatus of this character usually including a generator, a condenser, an evaporator, and an absorber interconnected to form a closed system.

An important object of my invention is to provide in apparatus of this type, means for automatically equalizing the pressure between the absorber and the generator at intervals so that the liquid will flow back to the generator by gravity in a cycle.

Another important object of my invention is to provide means in a refrigerating apparatus of the character indicated whereby the generator and condenser may be maintained at a high pressure corresponding to the condensation temperature required, while the evaporator and the absorber are maintained at low pressures corresponding to the temperature desired within the evaporator.

Another important object of my invention is to provide refrigerating apparatus of the type above mentioned wherein the usual moving parts such as pumps, float valves, and the like are eliminated and replaced by simple valves.

Another important object of my invention is to provide in such a continuously operating refrigerating system means for effecting the transfer of the liquid to and from the generator, the said means including inlets and outlets located within the generator.

Another important object of my invention is to provide refrigeration apparatus above referred to wherein all of the agencies necessary to accomplish continuous operation of the apparatus are present within the apparatus itself.

Other objects and advantages of my invention will be apparent from the following description in connection with the drawings, wherein, for purposes of illustration, I have shown preferred embodiments of my invention.

In the drawings:—

Figure 2 is a view similar to Figure 1 of a modified form of the refrigerating system.

Figure 1:
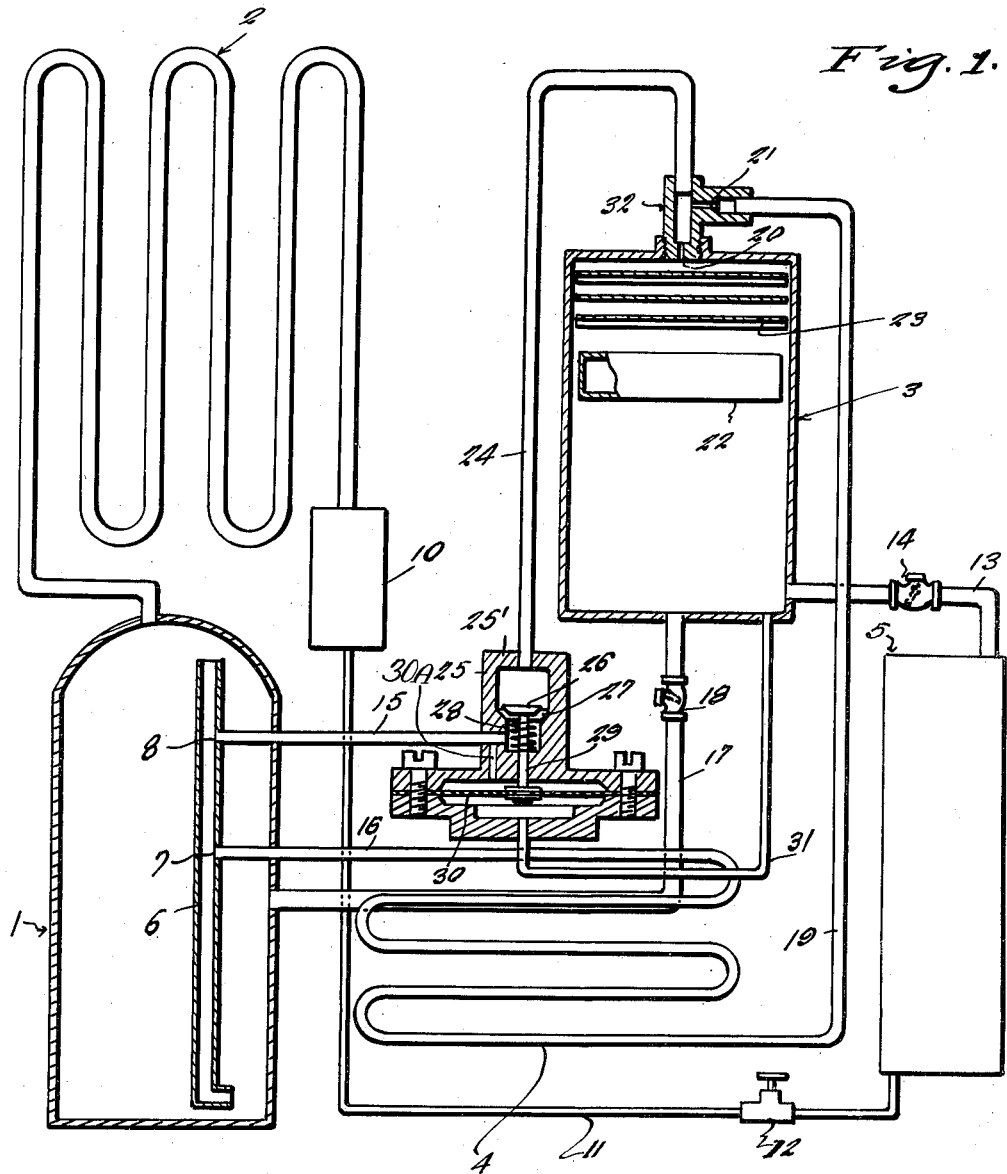
Figure 1 is a general representation of an absorption type refrigerating apparatus of the continuously operating variety, showing certain parts in section.

In the operation of a continuously operating absorption type refrigerating apparatus, the generator is charged with a liquid absorption material such as water having dissolved therein a quantity of refrigerant, such as ammonia, the resultant liquor being known as the strong liquor. Heat is applied to the generator so as to cause a liberation of ammonia gas from the liquor and the gas passes to the condenser wherein it is condensed and the condensate passes finally to the evaporator or cooling coil located within the compartment or room to be refrigerated. As the refrigerant is liberated from the liquor within the generator, the liquor becomes weaker and the weak liquor is conducted to the absorber to become again strong liquor by reabsorbing in the absorber the vapors originally liberated therefrom and subsequently collected in the absorber. The generator and the condenser are maintained at a high pressure corresponding to the condensation temperature necessary, while the evaporator and the absorber are maintained at low pressures corresponding to the temperature desired within the evaporator.

Referring in detail to the drawings, the embodiment shown in Figure 1 will be described first. The numeral 1 refers generally to a conventional type of generator, the numeral 2 generally designates a conventional type of condenser, the numeral 3 generally designates an absorber, the numeral 4 the weak liquor cooler, and the numeral 5 the evaporator.

In accordance with one of the important features of my invention, there is supported within the generator the vertical tube 6 which is open at its opposite ends and connected with two vertically spaced openings 7 and 8 are the pipes 15 and 16. The purpose of these ports in the tube 6 is to control the movement of the liquor between the absorber and the generator. Within the absorber 3 in the upper part thereof are horizontal baffle plates 23 whose purpose is to increase the absorption effect of the absorber by spreading the incoming liquor over the largest possible area. The absorber includes also the float 22 whose purpose is to decrease the area of the liquor at the same time that the pressure of the absorber is equal to that of the generator, thereby insuring a perfect transfer of the liquor from the absorber to the generator and a minimum absorption action at the time of the transfer.

A coupling 32, provided with two expansion ports 20 and 21, is mounted in the top of the absorber 3. As will presently appear, port 20 is in communication with the generator 1 through a conduit by which weak liquor may flow from the generator to the absorber and, similarly, port 21 is in communication with the generator through a second conduit by which liquor may flow from the generator to the absorber. These ports operate to offset the relatively high pressure of the absorptive liquor which is conducted from the generator to the absorber, thereby making it possible to maintain a relatively low pressure in the absorber.

The generator has communication with the absorber by the conduit 16, the weak liquor cooler 4, and the pipe 19 which latter communicates with the port 21 in the coupling 32. The generator has additional communication with the absorber by way of the pipe 15 and the valve 25. The pipe 24 which leads from the valve 25 connects with the expansion port 20 in the coupling 32.

The absorber has communication with the generator by means of the pipe 17, in which is located a check valve 18. The absorber also has communication with the valve 25, by means of the pipe 31.

When heat is applied to the generator the ammonia gas is driven off into the condenser 2 at high pressure and high temperature. The condenser operates to extract heat from the gas and produce condensation thereof into liquid which flows into the receiver 10 and from the receiver 10 through the pipe 11 to the evaporator 5. An expansion valve 12 is interposed in the pipe 11.

The liquid having arrived in the evaporator 5 it is there under such a reduced pressure that it absorbs heat thereby again becoming a gas and passes to the absorber by the pipe 13 and is absorbed by the liquid in the absorber. The pipe 13 has a check valve 14.

As stated above, the invention includes the idea of the transfer of the strong liquor from the absorber, a place of reduced pressure, to the generator which is a place of high pressure. It is obvious that the weak liquor of the generator at high pressure will flow to the absorber which is a place of lower pressure. But in order to produce continuous operation of the system, some means of transferring the strong liquor from the absorber to the generator must be provided. To accomplish this transfer of the strong liquor from the absorber to the generator I provide the simple valve which consists of the valve housing 25', the mushroom type valve 26, the seat 27, the tension spring 28, the stem 29 and the diaphragm 30. The valve stem 29 is secured to the diaphragm 30 and the spring 28 is circumposed on the valve stem in such a way that the valve is pushed upwardly and normally holds the valve open while the pressure between the absorber and the generator is equal.

To understand the operation of the apparatus shown in Fig. 1 and the purpose of valve 25 in effecting transfer of liquid from the absorber back to the generator, it will be helpful to follow one complete cycle of operation. Such a cycle consists of the circulation of a portion of the contents of the generator through the complete refrigeration system and back to the generator.

Starting with a fully charged generator in which the valve 25 is closed and the aqua ammonia solution stands at a level to just cover the open port 8 in the tube 6, this port 8 limits the height of the liquid level in the generator as will hereinafter be described. Heat applied to the generator distills ammonia vapor from the solution. This vapor creates a pressure in the generator, and vapor flows to the condenser on its path to the evaporator as hereinbefore described.

Vapor pressure in the generator forces liquid weak in ammonia from the bottom of the generator, up selector tube 6 through port 7 into the pipe 16, thence through the weak liquor cooling coil 4 and pressure reducing orifices 21 and 20, into the absorber. Here the weak liquid absorbs ammonia vapor coming from the evaporator and the liquid level continues to rise in the absorber and fall in the generator.

During this process of distilling the ammonia vapor from the liquor in the generator, the valve 25 will be held closed against the pressure of spring 28, by generator pressure exerted through pipe 15 and a passage 30—A in the valve 25 to the top of the diaphragm 30. On the lower side of diaphragm 30 is the lower absorber pressure conducted through tube 31. The weak liquid flowing into the absorber holds the pressure there low by performing its function of absorbing the ammonia vapor as fast as it comes from the evaporator.

When the level of the liquid in the generator has lowered to uncover port 7, vapor under generator pressure flows therethrough into the pipe 16 and to the absorber along the same path previously followed by the liquid. Since the vapor has no absorptive power as did the liquid, the pressure in the absorber rises to that of the pressure in the generator. Under this condition of balanced pressures the liquid in the absorber flows through check valve 18 and pipe 17 back into the generator by gravity.

The balancing of the pressure on opposite sides of the diaphragm 30 causes it to assume the position shown in Fig. 1, permitting the valve 25 to open. The valve 25 provides, during liquid transfer from the absorber back to the generator, a vapor passage so that the vapor displaced by the liquid entering the generator can leave and be conducted to the absorber to take the place of the liquid leaving the latter.

Pipe 16, coil 4 and pipe 19 are capable of balancing the pressures between the generator and absorber, but when the liquid level in the generator rises to the point that it covers port 8 it cuts off the flow of vapor that is necessary to promote the gravity transfer which demands balanced pressures in the absorber and generator.

Under the condition of balanced pressures, valve 25 remains open to maintain a pressure balance until liquid from the absorber rises in the generator and selector tube 6 to cover port 8. Valve 25 is held open by spring 28 which forces "mushroom" 26 off its seat as soon as the pressures are balanced on each side of the diaphragm 30.

When port 8 is covered by liquid, the ammonia vapor distilled by the applied heat builds an increasing pressure in the generator. This pressure forces weak liquid from the bottom of the generator up through selector tube 6, through ports 7 and 8, and through the above-mentioned passages from both ports to the absorber. As soon as weak liquor reaches the absorber the vapors therein are absorbed and the pressure becomes quickly reduced. This pressure reduction closes valve 25 by removing the pressure from the underside of the diaphragm 30 that allowed it to be held open during balanced pressure. At this point the apparatus is ready to start another liquid transfer cycle which proceeds in the manner previously described.

The embodiment of the invention which is shown in Figure 2 is similar to that described above in all essential respects except that instead of the coupling arrangement in Figure 1, the embodiment in Figure 2 has a valve 60 which operates in conjunction with a valve 40. The valve 40 opens upon an influx of gas from the generator and closes upon an influx of liquid. This permits a full flow of gas into the absorber but causes the liquid to flow more slowly. This function and the means whereby the same is accomplished will appear in the following description referring to Figure 2 of the drawings.

In the present embodiment between the generator and the absorber is located the separator 60. The generator communicates with the absorber 3a by way of the pipe 48, the separator 60, and the pipe 47. The generator has additional communication with the absorber 3a by way of the pipe 49, and also by way of the pipe 53 in which is located the check valve 52. Within the generator is the tube 6a with the vertically spaced ports 7a and 8a which control the flow of the liquid in and out of the generator, in the same manner as in the first described embodiment of the invention. When heat is applied to the generator, the liberated ammonia gas creates a head pressure within the generator. Since the liquid level in the generator is higher than the ports 7a and 8a the liquid is forced by this head pressure out of the generator and through the pipes 48 and 49, through the separator 60, the pipe 47, to the absorber. At the end of the pipe 47 is located a restricted orifice 55 which holds the pressure between the absorber and the generator equalized at all times. The arrangement is such that the weight of the valve 50 plus the weight of the column of liquid in the conduit 47 will hold the valve 50 on its seat whereby communication is cut off between the generator and the separator by way of the pipe 49. Inasmuch as liquid will follow the path of least resistance, the liquid will then flow out of the generator through the opening 7a into the absorber by way of the pipes 48 and 47 where the liquid comes in contact with the ammonia gas from the chilling unit 4a. When the liquid in the generator goes below the opening 7a the gas located in the upper part of the generator will pass through the opening 7a into the absorber by way of the pipes 48 and 47. Inasmuch as the volume of gas flowing through a conduit at a given pressure will be many times the volume of a liquid flowing therethrough in a given time, the pressure between the absorber and the generator will be very quickly equalized. When the pressure between the generator and the absorber is equal the liquid will flow into the generator by way of the pipe 53 and the check valve 52. As the liquid level rises in the generator and moves up in the conduit 48 from this influx of liquid, the opening 7a will be closed by the rising liquid. When the column of liquid in the conduit 48 rises above the level of the liquid in the generator, the separator valve 50 is opened and this establishes communication between the generator and the separator through the opening 8a and the pipe 49. Communication between the generator and the absorber through the opening 8a and the pipe 49 and the separator 60 will continue until the liquid level in the generator has become higher than the opening 8a, which starts the cycle again.

The restricted opening 55 is controlled by the needle valve 56 which is operated by the spring 57 working against the diaphragm 58 on which the valve pin is mounted in the valve housing 59. The restricted opening 55 is in communication with the interior of the valve and the interior of the valve is in communication with the upper end of the absorber by means of the pipe 61. A guide portion 62 formed on the valve 56 slides loosely on the sides of the valve chamber so as to permit pressure to reach the adjacent side of the diaphragm. The valve 56 never completely closes so that some liquid from the pipe 47 flows into the absorber during the partly closed position of the valve.

It will be seen that the embodiment of the invention shown in Fig. 2 utilizes the same liquid level and pressure balance principles as the structure shown in Fig. 1. In this form, the pressure reducing valve 40, well known to the art for the purpose of admitting weak liquid to the absorber at reduced pressure, is substituted for fixed pressure reducing orifices 20 and 21 of Fig. 1 and the valve 50 is employed to perform the same function as pressure balancing valve 25 of Fig. 1, that is, to maintain an open passage to balance vapor pressures between the generator and absorber during the time that liquid is being transferred by gravity from the absorber to the generator. During this transfer period, valve 50, as above stated, is held open by vapor pressure in the generator. Valve 50 is of such weight that a slight generator pressure can open the valve more easily than it can force a column of liquid through port 7a and up tube 48.

When the transfer period is completed by the filling of the generator to port 8a, the generator pressure increases to force a column of liquid up tube 49 to valve 50. However, the increased generator pressure, sufficient to raise liquid instead of vapor through tube 49, is sufficient to raise liquid above valve 50 in tube 48. Then valve 50 remains closed of its own weight until a full absorbing cycle takes place.

Thus it will be understood that the two valves 25 in Fig. 1, and 50 in Fig. 2 are to fulfill the same purpose by being opened and closed at the same point in the system and at the same times in the operation cycle. Valve 25 is caused to open and close by pressure relation between the generator and absorber, while valve 50 is caused to open and close by the weight relation between liquid columns in two pipes.

Although I have shown and described herein preferred embodiments of my invention, it is to be definitely understood that I do not desire to limit the application of the invention thereto, and any change or changes may be made in the structure and arrangement of the parts within the spirit of the invention and the scope of the subjoined claims.

What is claimed is:—

1. In an absorption refrigerating apparatus of the continuously operating type, the combination with a generator, a condenser, an evaporator, an absorber, and means for conducting refrigerant from the generator through the condenser and evaporator to the absorber, of means operated by the pressure of the refrigerant and controlled by the liquid level in the generator for conducting an absorptive liquid weak in refrigerant from the generator to the absorber and for returning absorptive liquid rich in refrigerant from the absorber to the generator, said last-mentioned means including a conduit between the generator and the absorber and a pressure-controlled valve in said conduit adapted under conditions of balanced pressure between the generator and the absorber to permit transfer of refrigerant vapor from the generator to the absorber through said conduit and under conditions of unbalanced pressure to prevent such transfer.

2. In an absorption refrigerating apparatus of the continuously operating type, the combination with a generator, a condenser, an evaporator, an absorber, and means for conducting refrigerant from the generator through the condenser and evaporator to the absorber, of means operated by the pressure of the refrigerant and controlled by the liquid level in the generator for conducting an absorptive liquid weak in refrigerant from the generator to the absorber and for returning absorptive liquid rich in refrigerant gravitationally from the absorber to the generator, said last-mentioned means including a conduit between the generator and the absorber and a pressure-controlled valve in said conduit adapted under conditions of balanced pressure to permit transfer of refrigerant vapor from the generator to the absorber through said conduit and under conditions of unbalanced pressure to prevent such transfer.

3. In an absorption refrigerating apparatus of the continuously operating type, the combination with a generator, a condenser, an evaporator, an absorber, and means for conducting refrigerant from the generator through the condenser and evaporator to the absorber, of means operated by the pressure of the refrigerant and controlled by the liquid level in the generator for conducting an absorptive liquid weak in refrigerant from the generator to the absorber and for returning absorptive liquid rich in refrigerant from the absorber to the generator, said last mentioned means including vertically spaced fluid draw-off ports located in the generator, and means connecting said ports with the absorber, the lower of said ports being located so as to be uncovered at the end of the generating stage to allow vapor to enter the absorber for equalizing the pressure between the generator and the absorber, and the upper of said ports being adapted to provide a vapor vent to allow vapor to enter the absorber to displace the returning liquid.

4. In an absorption refrigerating apparatus of the continuously operating type, the combination with a generator, a condenser, an evaporator, an absorber, and means for conducting refrigerant from the generator through the condenser and evaporator to the absorber, of means operated by the pressure of the refrigerant and controlled by the liquid level in the generator for conducting an absorptive liquid weak in refrigerant from the generator to the absorber and for returning absorptive liquid rich in refrigerant gravitationally from the absorber to the generator, said last mentioned means including vertically spaced fluid draw-off ports located in the generator, means connecting said ports with the absorber, and valve means in the upper of said connecting means, shutting off communication between the absorber and the upper port during the generating stage and adapted to open when pressure between the generator and absorber is equalized, to allow vapor to enter the absorber to displace the returning liquor, the lower of said connections serving during the generating stage to carry weak liquor to the absorber, and at the end of such stage, to allow vapor to escape from the generator to the absorber to effect such equalization of pressures.

5. In an absorption refrigerating apparatus of the continuous operating type, the combination with a generator, a condenser, an evaporator, an absorber, and means for conducting refrigerant from the generator through the condenser and evaporator to the absorber, of means operated by the pressure of the refrigerant and controlled by the liquid level in the generator for conducting an absorptive liquid weak in refrigerant from the generator to the absorber and for returning absorptive liquid rich in refrigerant from the absorber to the generator, said last mentioned means including vertically spaced fluid draw-off ports located in the generator at substantially the upper and lower limits, respectively, of the liquid level, separate means connecting said ports with the absorber, and means for supplying liquid weak in refrigerant to said ports from a point near the bottom of the generator, said ports being so arranged that gas is conveyed from the upper one thereof to the absorber to maintain a balanced pressure between the absorber and the generator after the returning liquid in the generator has risen above the lower port.

6. In an absorption refrigeration closed system including a generator, a condenser, an evaporator, an absorber, a refrigerant fluid, and an absorption liquor, means for conducting absorption liquor from said generator to said absorber by reason of a difference in pressures between said generator and said absorber, second means for returning the absorption liquor to said generator from said absorber by equalizing the pressures between said absorber and said generator, said generator including an internal vertical tube open at each end and having its lower end close to the bottom of the generator to draw upon the weaker refrigerant fluid at the bottom of the generator, said tube being formed with vertically spaced ports, said ports being connected to said absorber.

7. In an absorption refrigeration closed system including a generator, a condenser, an evaporator, an absorber, a refrigerant fluid, and an absorption liquor, means for conducting absorption liquor from said generator to said absorber by reason of a difference in pressures between said generator and said absorber, second means for returning the absorption liquor to said generator from said absorber by equalizing the pressures between said absorber and said generator, said generator including an internal vertical tube open at each end and having its lower end close to the bottom of the generator to draw upon the weaker refrigerant fluid at the bottom of the generator, said tube being formed with vertically spaced ports, said ports being connected to said absorber, and fourth means for equalizing the pressures between said generator and absorber by means of said vertically spaced ports.

8. In an absorption refrigeration closed system including a generator, a condenser, an evaporator, an absorber, a refrigerant fluid, and an absorption liquor, means for conducting absorption liquor from said generator to said absorber by reason of a difference in pressures between said generator and said absorber, second means for returning the absorption liquor to said generator from said absorber by equalizing the pressures between said absorber and said generator, the first mentioned means including a coupling connected to said absorber and providing two separate connections with the generator, said coupling having expansion ports operating to offset the relatively high pressure of the absorption liquor being conducted from the generator to said absorber so as to produce a relatively low pressure in said absorber.

9. In an absorption refrigeration closed system including a generator, a condenser, an evaporator, an absorber, a refrigerant fluid, and an absorption liquor, means for conducting absorption liquor from said generator to said absorber by reason of a difference in pressures between said generator and said absorber, second means for returning the absorption liquor to said generator from said absorber by equalizing the pressures between said absorber and said generator, said second means including valve means for temporarily preserving the pressure equalization so as to permit the absorption liquor to flow from said absorber gravitationally, said valve means having a gravitationally operated normally closed part, and connections between said valve, the generator and the absorber, adapted to admit beneath said valve part, during the equalizing stage, vapor from the upper region of the generator, to cause said valve part to raise under the pressure of such vapor, and to allow such vapor to thence flow to the absorber; and adapted to provide a column of liquor in communication with the generator, the upper limit of which column is adapted under increasing vapor pressure in the generator, to communicate with the upper side of said valve part at the end of the equalizing stage and to thereby allow the valve part to move to closed position by gravity, said column being balanced during the equalizing stage, with its upper limit at a level below that of its communication with the valve so as to allow a free vapor passage through the valve to exist.

10. In an absorption refrigeration apparatus of the continuously operating type, the combination with a generator, a condenser, an evaporator, an absorber, and means for conducting refrigerant from the generator through the condenser and evaporator to the absorber, of means operated by the vapor pressure of the refrigerant and controlled by the liquid level in the generator for conducting alternately absorptive liquid and refrigerant vapor from the generator to the absorber, and for returning absorptive liquid rich in refrigerant from the absorber to the generator, said second means comprising a port at substantially the height of the upper level of the generator liquid in communication with the top region of the generator, the bottom region of the generator and the absorber, and a port at substantially the height of the lower level of the generator liquid in communication with the top region of the generator, the bottom region of the generator and the absorber.

11. In an absorption refrigeration apparatus of the class described, the combination with a generator and absorber, of means operated by the vapor pressure of the refrigerant and controlled by the liquid level of the generator for conducting absorptive liquid from the generator to the absorber, and means for returning said absorptive liquid from the absorber back to the generator, said first-mentioned means comprising a conduit beginning near the minimum level of the body of liquid in the generator, adapted to convey liquid from said body when the level thereof is above the minimum, and to convey vapor from the space above said body when the liquid level is near or at the minimum, and said last mentioned means comprising a gas vent and a pressure controlled valve therein which opens to permit refrigerant vapor to flow directly from the generator to the absorber to displace the liquid that flows gravitationally from the absorber to the generator displacing said vapor.

12. In continuous absorption refrigeration apparatus requiring a periodic equalization of pressure between the generator and absorber to effect a gravitational return of liquid from the absorber to the generator, the combination of a generator, an absorber, means for effecting transfer of absorptive liquid from the generator to the absorber, means for controlling the minimum liquid level in said generator, said means including a selector tube having spaced inlet openings providing communication between the upper and lower parts, respectively, of said generator and a conduit joining said selector tube at a point adjacent the minimum generator liquid level to provide a liquid passage to said absorber only while the generator liquid level remains above said minimum point, and a conduit for returning refrigerant from the absorber to the generator.

13. In absorption refrigeration apparatus of the continuous operating type requiring a periodic equalization of pressure between the generator and absorber to effect a gravitational return of liquid from the absorber to the generator, the combination of a generator, an absorber, a condenser and evaporator connected to form closed circuits for the refrigerant and absorptive liquid, including an absorber feed passage from said generator to said absorber, said passage comprising a selector tube having its upper and lower ends in communication with the upper and lower parts, respectively, of said generator, a port in said selector tube positioned at a point adjacent the lowest liquid level of said generator, and a conduit from said port to said absorber, said absorber feed passage being adapted, by means of said selector tube, to select weak liquor from the bottom of said generator for delivery to said absorber when the liquid level in said generator is above said port, and to select refrigerant vapor from the top of said generator for delivery to said absorber when the generator liquid level drops sufficiently to uncover said port.

14. In continuous absorption refrigeration apparatus requiring a periodic equalization of pressure between the generator and absorber to effect a gravitational return of liquid from the absorber to the generator, the combination of a generator, an absorber, an absorptive liquid conduit from said generator to said absorber, a pressure equalizing conduit providing communication between a point substantially at the maximum liquid level in the generator and the absorber, and a conduit for returning liquid from the absorber to the generator when the pressures therein are equalized.

15. In continuous absorption refrigeration apparatus requiring a periodic equalization of pressure between the generator and absorber to effect a gravitational return of liquid from the absorber to the generator, the combination of a generator, an absorber, means for equalizing the pressure between said generator and absorber, said means comprising a first conduit leading from said generator to said absorber and disposed to conduct vapor from the generator to the absorber when the liquid level in said generator shall have fallen below the opening of said first conduit, a second conduit between a point substantially at the upper liquid level of said generator and said absorber, and a valve in said second conduit disposed to open providing a pressure equalization when said first conduit shall have provided approximate pressure equalization, and conduits for the transfer of liquid between said generator and absorber in accordance with predetermined pressure conditions therebetween.

16. In continuous absorption refrigeration apparatus requiring a periodic equalization of pressure between the generator and absorber to effect a gravitational return of liquid from the absorber to the generator, the combination of a generator, an absorber, means communicably connecting said generator and absorber to permit transfer of liquid therebetween under predetermined pressure conditions, and means for controlling the quantity of liquid transferred between said generator and absorber, said means comprising a first conduit from substantially the low liquid level of said generator to said absorber, a second conduit from substantially the upper liquid level of said generator to said absorber, and a pressure-sensitive valve in said second conduit disposed to remain open only during the condition of approximate pressure balance between said generator and absorber, said valve when open permitting transfer of fluid from the generator to the absorber.

17. In continuous absorption refrigeration apparatus requiring a periodic equalization of pressure between the generator and absorber to effect a gravitational return of liquid from the absorber to the generator, the combination of a generator, an absorber, a selector tube extending between the lower and upper part of said generator, a first conduit between said selector tube at substantially the point of minimum generator liquid level and said absorber, a second conduit between said selector tube at substantially the maximum generator liquid level and said absorber, a pressure equalizing valve in said second conduit disposed to remain open during pressure equalization between said generator and absorber, and a third conduit providing for gravitational passage of liquid from said absorber to said generator under the condition of pressure equalization.

18. In continuous absorption refrigeration apparatus, the combination of a generator, an absorber, a return line for gravitationally conveying strong liquor from the absorber to the generator, a conduit for conveying weak liquor from the generator to the absorber, said conduit beginning at a point adjacent the minimum liquid level of the generator, whereby it will be exposed to the vapor in the generator when the liquid therein drops to a minimum level and will conduct vapor to the absorber to effect initial equalization of pressure between the generator and absorber thus allowing the strong liquor to flow gravitationally through said return line, and means providing communication between the intake of said conduit and the upper region in the generator, whereby vapor may be drawn from said region into the conduit.

19. In continuous absorption refrigeration apparatus, the combination of a generator, an absorber, a return line for gravitationally conveying strong liquor from the absorber to the generator, and a conduit for conveying weak liquor from the generator to the absorber, said conduit being connected at the minimum liquid level, with means comprising a tube of restricted cross-sectional dimension extending to a point near the bottom of the generator, and providing communication with the weaker liquor in the bottom of the generator and also with the upper region in the generator, whereby vapor may be drawn from said region into the conduit.

20. In continuous absorption refrigeration apparatus, the combination of a generator, an absorber, a return line for gravitationally conveying strong liquor from the absorber to the generator, a conduit for conveying weak liquor from the generator to the absorber, said conduit beginning at a point adjacent the minimum liquid level of the generator, whereby it will be exposed to the vapor in the generator when the liquid therein drops to a minimum level and will conduct vapor to the absorber to effect initial equalization of pressure between the generator and absorber to allow the strong liquor to flow gravitationally through said return line, and a vapor vent communicating with the generator near the maximum liquid level therein for continuing the pressure equalization after the liquor returning to the generator has again risen above the level of said conduit.

21. In continuous absorption refrigeration apparatus, the combination of a generator, an absorber, a return line for gravitationally conveying strong liquor from the absorber to the generator, a conduit for conveying weak liquor from the generator to the absorber, said conduit beginning at a point adjacent the minimum liquid level of the generator, whereby it will be exposed to the vapor in the generator, when the liquid therein drops to a minimum level and will conduct vapor to the absorber to effect initial equalization of pressure between the generator and absorber to allow the strong liquor to flow gravitationally through said return line, and a vapor vent communicating with the generator near the maximum liquid level therein, for continuing the pressure equalization after the liquor returning to the generator has again risen above the level of said conduit, said vent being adapted to open as a result of said initial pressure equalization and to close as a result of pressure increase in the generator and pressure decrease in the absorber during the beginning of the generating stage.

22. In an absorption refrigeration closed system including a generator, a condenser, an evaporator, an absorber, a refrigerant fluid, and an absorption liquor, means for conducting absorption liquor from said generator to said absorber by reason of a difference in pressures between said generator and said absorber, second means controlled by the liquid level in the generator for causing return of the absorption liquor to said generator from said absorber by equalizing the pressures between said absorber and said generator, said second means including a gas vent and a pressure controlled valve therein for temporarily preserving the pressure equalization so as to permit the absorption liquor to flow from said absorber gravitationally.

23. In an absorption refrigeration closed system including a generator, a condenser, an evaporator, an absorber, a refrigerant fluid, and an absorption liquor, means for conducting absorption liquor from said generator to said absorber by reason of a difference in pressures between said generator and said absorber, second means controlled by the liquid level in the generator for returning the absorption liquor to said generator from said absorber by equalizing the pressures between said absorber and said generator, said second means including a gas vent and a pressure controlled valve therein for temporarily preserving the pressure equalization so as to permit the absorption liquor to flow from said absorber gravitationally, said second means further including a fluid pressure connection between said absorber and said valve means whereby said valve means is opened or closed according to the pressures within said absorber.

24. In an absorption refrigeration closed system including a generator, a condenser, an evaporator, an absorber, a refrigerant fluid, and an absorption liquor, means for conducting absorption liquor from said generator to said absorber by reason of a difference in pressures between said generator and said absorber, second means controlled by the liquid level in the generator for causing return of the absorption liquor to said generator from said absorber by equalizing the pressures between said absorber and said generator, said second means including a needle valve interposed between said generator and said absorber, said needle valve being normally slightly open so as to permit a reduced flow of refrigerant fluid from said generator to said absorber, said needle valve being arranged to be opened by fluid under pressure coming from said generator into said absorber so as to permit continuance of the equalization of pressures therebetween.

25. In an absorption refrigeration closed system including a generator, a condenser, an evaporator, an absorber, a refrigerant fluid, and an absorption liquor, means for conducting absorption liquor from said generator to said absorber by reason of a difference in pressures between said generator and said absorber, second means controlled by the liquid level in the generator for causing return of the absorption liquor to said generator from said absorber by equalizing the pressures between said absorber and said generator, said second means including a floating body in said absorber in baffling relation to the incoming refrigerant fluid so as to shield the absorption liquor in the absorber so as to procure equalized absorption of the incoming fluid and thereby procure more perfect pressure equalization.

26. In an absorption refrigeration closed system including a generator, a condenser, an evaporator, an absorber, a refrigerant fluid, and an absorption liquor, means for conducting absorption liquor from said generator to said absorber by reason of a difference in pressures between said generator and said absorber, second means controlled by the liquid level in the generator and including a gas vent and a pressure controlled valve therein for causing return of the absorption liquor to said generator from said absorber by equalizing the pressures between said absorber and said generator, the said pressure controlled valve being arranged to remain closed while a difference in pressure exists between said generator and said absorber and to open during an equalization of pressure therebetween.

27. In continuous absorption refrigeration apparatus requiring a periodic equalization of pressure between the generator and absorber to effect gravitational return of liquid from the absorber to the generator, the combination of a generator, an absorber, an absorptive liquid conduit from said generator to said absorber, a pressure equalizing conduit providing communication between a point substantially above the bottom of the generator and the absorber, a conduit for returning liquid from the absorber to the generator when the pressures therein are equalized, and a balancing valve in said pressure equalizing conduit adapted to be periodically opened by equalization of pressure between the absorber and the generator and to remain open during the transfer of liquid from the former to the latter, said pressure equalizing conduit being arranged to conduct a small quantity of liquid from the generator to the absorber when the liquid returning from the absorber to the generator rises to the intake of said conduit to thereby reduce the pressure in the absorber and close the balancing valve, thus terminating the return of liquid from the absorber to the generator pending another equalization of pressure between said elements.

28. In an absorption refrigeration closed system including a generator, a condenser, an evaporator, an absorber, a refrigerant fluid, and an absorption liquor, means for conducting absorption liquor from said generator to said absorber by reason of a difference in pressures between said generator and said absorber, second means controlled by the liquid level in the generator for causing return of the absorption liquor to said generator from said absorber by reason of equalization of the pressures in said absorber and said generator, said second means including valve means for temporarily preserving the pressure equalization to permit the absorption liquor to flow from said absorber to the generator gravitationally for a predetermined period, said valve being periodically opened and closed by successive balancing and unbalancing of the generator and absorber pressures.

29. In an absorption refrigeration closed system including a generator, a condenser, an evaporator, an absorber, a refrigerant fluid, and an absorption liquor, means for conducting absorption liquor from said generator to said absorber by reason of a difference in pressures between said generator and said absorber, second means controlled by the liquid level in the generator for causing return of the absorption liquor to said generator from said absorber by reason of equalization of the pressures in said absorber and said generator, the second mentioned means including a valve interposed between said generator and said absorber and arranged to remain closed while a difference in pressure exists between said generator and said absorber and to open during an equalization of pressure therebetween.

ANDREW FLUKES.